(12) United States Patent
Kaya et al.

(10) Patent No.: US 9,022,205 B2
(45) Date of Patent: May 5, 2015

(54) ARTICLE CARRIER APPARATUS

(75) Inventors: Koji Kaya, Ishikawa-Ken (JP);
Katsunori Tanikawa, Ishikawa-Ken (JP)

(73) Assignee: Shibuya Kogyo Co., Ltd., Kanazawa-shi (JP)

( * ) Notice: Subject to any disclaimer, the term of this patent is extended or adjusted under 35 U.S.C. 154(b) by 937 days.

(21) Appl. No.: 12/661,883

(22) Filed: Mar. 25, 2010

(65) Prior Publication Data
US 2010/0258408 A1 Oct. 14, 2010

(30) Foreign Application Priority Data
Apr. 8, 2009 (JP) ................................. 2009-094303

(51) Int. Cl.
*B65G 47/86* (2006.01)
*B65G 47/84* (2006.01)
(52) U.S. Cl.
CPC .................................... *B65G 47/847* (2013.01)
(58) Field of Classification Search
None
See application file for complete search history.

(56) References Cited

U.S. PATENT DOCUMENTS

| 4,467,847 A * | 8/1984 | Zodrow ........................... 141/98 |
| 4,919,799 A * | 4/1990 | Menardi et al. ................ 209/538 |
| 2006/0086410 A1 * | 4/2006 | Bernhard ...................... 141/147 |

FOREIGN PATENT DOCUMENTS

JP 2008-222428 9/2008

* cited by examiner

*Primary Examiner* — Kavel Singh
(74) *Attorney, Agent, or Firm* — Flynn, Thiel, Boutell & Tanis, P.C.

(57) ABSTRACT

An article carrier includes a first supply wheel adjacent to a receiving wheel and a second supply wheel provided on the upstream side in the rotating direction of the receiving wheel from the first supply wheel. A switching device for switching a gripper of the first supply wheel between a use state so as to transfer a plastic bottle to a gripper of the receiving wheel and a retracted state so as not to interfere with the plastic bottle held by the gripper of the receiving wheel is also provided. When a first carrier path is used, the switching device brings the gripper of the first supply wheel into the use state, and when a second carrier path is used, the switching device brings the gripper of the first supply wheel into the retracted state.

4 Claims, 7 Drawing Sheets

ARTICLE CARRIER APPARATUS

FIELD OF THE INVENTION

The present invention relates to an article carrier apparatus, and more particularly, to an article carrier apparatus in which a plurality of rotating wheels each having a plurality of grippers provided at equal intervals in the circumferential direction to grip an article are arranged, and the article is transferred from a gripper of a supply wheel on the upstream side to a gripper of a receiving wheel on the downstream side at a transfer position where the rotating wheels are located adjacent to each other.

DESCRIPTION OF THE PRIOR ART

Conventionally, there has been known an article carrier apparatus in which a plurality of rotating wheels each having a plurality of grippers provided at equal intervals in the circumferential direction to grip an article are arranged, and the article is transferred from a gripper of a supply wheel on the upstream side to a gripper of a receiving wheel on the downstream side at a transfer position where the rotating wheels are located adjacent to each other.

The article carrier apparatus is used for a beverage production line for filling a beverage into a plastic bottle, for example. The beverage production line includes a blow molding line for blow molding a plastic bottle, and a filling line for filling a beverage into the plastic bottle. The beverage production line can thereby fill a beverage into a plastic bottle while molding a plastic bottle (Patent Document 1: Japanese Patent Laid-Open No. 2008-222428).

For example, when a new plastic-bottled beverage is put on sale, a plastic bottle having a new shape may be used. It is necessary to perform a filling test into the plastic bottle having a new shape in the beverage production line.

At the same time, there is a demand to mold the plastic bottle having a new shape in advance and supply the plastic bottle to the filling line without molding the plastic bottle by using the blow molding unit.

In this case, it is necessary to provide a carrier path separately from a carrier path from the blow molding unit in the article carrier apparatus for transferring an article from the supply wheel to the receiving wheel adjacent to each other. Thus, there is a problem that a large number of man-hours are required to switch the carrier paths.

SUMMARY OF THE INVENTION

The present invention provides an article carrier apparatus capable of effectively switching a plurality of carrier paths.

That is, an article carrier apparatus according to the invention is an article carrier apparatus in which a plurality of rotating wheels each having a plurality of grippers provided at equal intervals in a circumferential direction to grip an article are arranged, and the article is transferred from a gripper of a supply wheel on an upstream side to a gripper of a receiving wheel on a downstream side at a transfer position where the rotating wheels are located adjacent to each other, including:

a first supply wheel adjacent to the receiving wheel, and a second supply wheel provided on an upstream side in a rotating direction of the receiving wheel from the first supply wheel, as the supply wheel, and switching means for switching a gripper of the first supply wheel between a use state so as to transfer the article to the gripper of the receiving wheel and a retracted state so as not to interfere with the article held by the gripper of the receiving wheel, wherein when a first carrier path for transferring the article from the first supply wheel to the receiving wheel is used, the switching means brings the gripper of the first supply wheel into the use state, and when a second carrier path for transferring the article from the second supply wheel to the receiving wheel is used, the switching means brings the gripper of the first supply wheel into the retracted state, to thereby prevent the gripper of the first supply wheel from interfering with the article held by the gripper of the receiving wheel from the second supply wheel.

An article carrier apparatus according to the invention is the article carrier apparatus further including a motor for rotating the first supply wheel, the second supply wheel, and the receiving wheel in synchronization, wherein the second supply wheel continues to be rotated when the first carrier path is used, and the first supply wheel continues to be rotated when the second carrier path is used.

An article carrier apparatus according to the invention is the article carrier apparatus, wherein the gripper of the receiving wheel includes a pair of grip members provided in an openable and closable manner to grip the article, and second switching means for switching the gripper of the receiving wheel between an opening and closing state in which the grip members are opened and closed to receive the article and a closed state in which the grip members are maintained in a closed state at a transfer position of the article with the first supply wheel is provided, the second switching means bringing the gripper into the opening and closing state when the first carrier path is used, and the second switching means bringing the gripper into the closed state to maintain the gripper in a state of gripping the article received from the second supply wheel when the second carrier path is used.

An article carrier apparatus according to the invention is the article carrier apparatus, wherein one of the first supply wheel and the second supply wheel transfers a plastic bottle molded by a blow molding unit to the receiving wheel, and the other one of the first supply wheel and the second supply wheel transfers a plastic bottle from a bulk depalletizer to the receiving wheel.

DETAILED DESCRIPTION OF THE EMBODIMENTS

Figure 1:
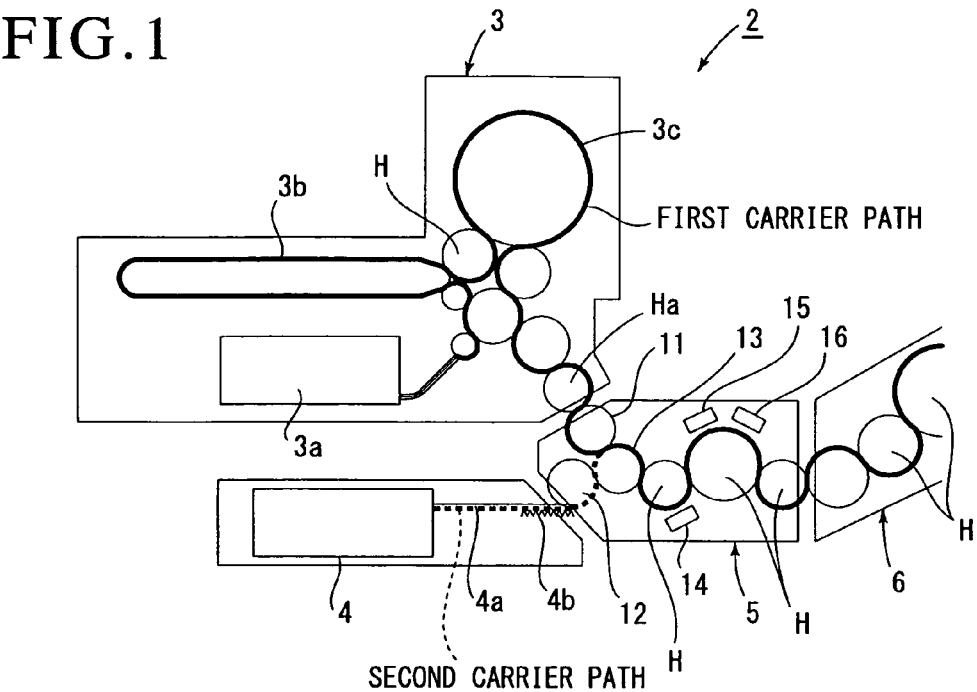
FIG. 1 is a plan view of a beverage production line according to a first embodiment.

In the following, the present invention will be described with reference to embodiments shown in the drawings. FIG. 1 shows a beverage production line 2 for performing molding of a plastic bottle 1 as an article to fill with a beverage. The beverage production line 2 includes a blow molding unit 3 for blow molding a plastic bottle 1, a bulk depalletizer 4 for supplying a molded plastic bottle 1, an appearance inspection unit 5 for performing an appearance inspection of the plastic bottle 1 supplied from the blow molding unit 3 and the bulk depalletizer 4, and a filling unit 6 provided on the downstream side from the appearance inspection unit 5 to rinse the plastic bottle 1, fill a beverage thereinto and the like.

The blow molding unit 3, the bulk depalletizer 4, the appearance inspection unit 5, and the filling unit 6 are respectively independent from each other within a range enclosed by each solid line, and are respectively controlled to be in synchronization with each other by unillustrated control means.

Each of the blow molding unit 3, the appearance inspection unit 5, and the filling unit 6 includes a plurality of rotating wheels H as an article carrier apparatus respectively driven by a servo motor. The plastic bottle 1 is transferred from a rotating wheel H on the upstream side to a rotating wheel H on the downstream side, so that the plastic bottle 1 is carried.

In the beverage production line 2 according to a present embodiment, a first carrier path indicated by a heavy line in the drawing employed for filling a beverage into the plastic bottle 1 molded by the blow molding unit 3, and a second carrier path indicated by a heavy dashed line in the drawing employed for filling a beverage into the plastic bottle 1 supplied from the bulk depalletizer 4 can be switched.

The blow molding unit 3 includes parison supply means 3a for supplying a parison, preheating means 3b for preheating the parison, and blow molding means 3c for blow molding the parison into the plastic bottle 1.

A plurality of rotating wheels H for carrying the parison or the molded plastic bottle 1 are provided among the parison supply means 3a, the preheating means 3b, and the blow molding means 3c. A discharge wheel Ha for transferring the plastic bottle 1 to the appearance inspection unit 5 is employed as a rotating wheel H located at the downstream end of the blow molding unit 3.

The bulk depalletizer 4 pulls the plastic bottle 1 out of an unillustrated pallet which stores a plurality of molded plastic bottles 1. A neck carrier conveyor 4a provided adjacent to the bulk depalletizer 4 supports the lower surface of a neck ring 1a of the plastic bottle 1 to carry the plastic bottle 1 one by one. The plastic bottle 1 is transferred to the appearance inspection unit 5 through an infeed screw 4b provided at the downstream end.

The appearance inspection unit 5 includes a first supply wheel 11 provided adjacent to the discharge wheel Ha of the blow molding unit 3, a second supply wheel 12 provided adjacent to the infeed screw 4b of the bulk depalletizer 4, a receiving wheel 13 for receiving the plastic bottle 1 from the first and second supply wheels 11 and 12, three rotating wheels H provided on the downstream side from the receiving wheel 13, and first to third inspecting means 14 to 16 provided along the rotating wheels H.

The first to third inspecting means 14 to 16 respectively perform the appearance inspection of the plastic bottle 1, the inspection of the neck ring 1a (see FIG. 3), the inspection of an opening and the inspection of a bottom portion, which are well known in the art. The description thereof is thus omitted.

The filling unit 6 includes a plurality of rotating wheels H, and also includes a rinser for rinsing the plastic bottle 1, a filler for filling a beverage, and a capper for installing a cap.

Figure 2:
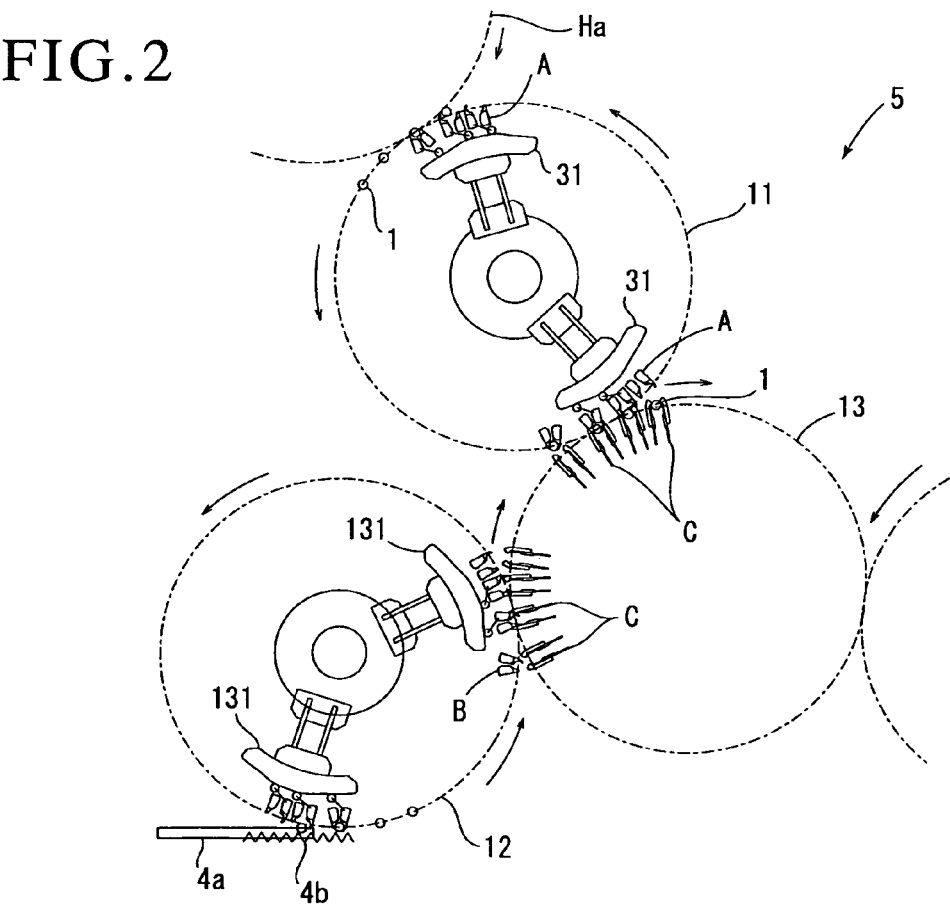
FIG. 2 is a plan view illustrating a portion of an appearance inspection unit according to the first embodiment.

FIG. 2 is an enlarged view of the first supply wheel 11, the second supply wheel 12, and the receiving wheel 13 of the appearance inspection unit 5. The first supply wheel 11, the second supply wheel 12, and the receiving wheel 13 are driven by a single servo motor via unillustrated transmitting means of the appearance inspection unit 5.

The first and second supply wheels 11 and 12 are rotated in the counter-clockwise direction, and the receiving wheel 13 is rotated in the clockwise direction. The second supply wheel 12 is provided on the upstream side in the rotating direction of the receiving wheel 13 from the first supply wheel 11.

A plurality of grippers A each having an opening and closing mechanism are provided in the first supply wheel 11 at equal intervals in the circumferential direction. The rotating position of each of the grippers A is recognized by the control means via an unillustrated encoder provided in the first supply wheel 11.

A plurality of grippers B each having an opening and closing mechanism are provided in the second supply wheel 12 at equal intervals in the circumferential direction. A plurality of grippers C having no opening and closing mechanism are provided in the receiving wheel 13 at equal intervals in the circumferential direction.

Switching means 17 controlled by the control means to switch the gripper A to a retracted state or a use state when an operator selects the first carrier path or the second carrier path is provided in the first supply wheel 11 in the present embodiment.

When the plastic bottle 1 is carried through the first carrier path, the control means brings the gripper A into the use state by the switching means 17, so that the plastic bottle 1 is transferred from the first supply wheel 11 to the receiving wheel 13.

Meanwhile, when the plastic bottle 1 is carried through the second carrier path, the plastic bottle 1 is transferred from the second supply wheel 12 to the receiving wheel 13. At this point, the control means brings the gripper A into the retracted state by the switching means 17, to thereby prevent the gripper A of the first supply wheel 11 from interfering with the plastic bottle 1 held by the gripper C of the receiving wheel 13.

By using the switching means 17 as described above, the two carrier paths can be switched to fill a beverage into the plastic bottle 1.

Next, the gripper A provided in the first supply wheel 11, and the switching means 17 for switching the gripper A between the use state and the retracted state will be described by using FIGS. 3 to 7.

Figure 5:
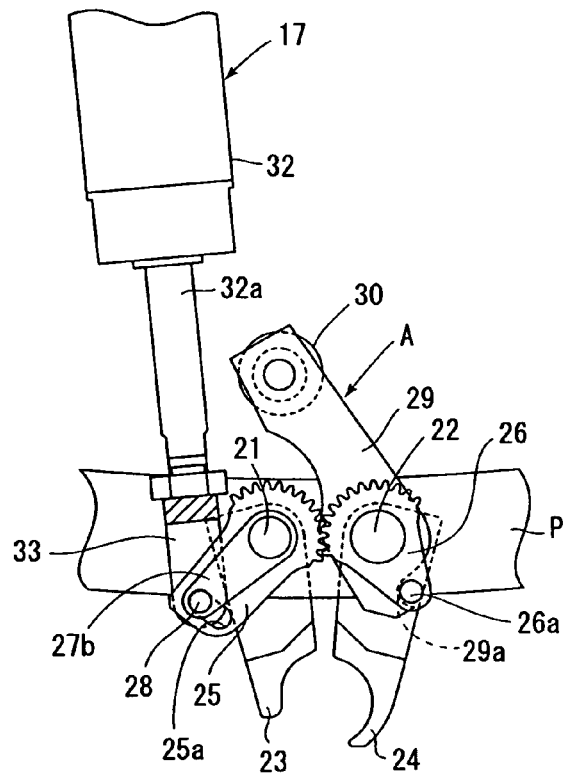
FIG. 5 is a plan view of the gripper A and illustrating a state in which the gripper A is closed in a use state.
Figure 6:
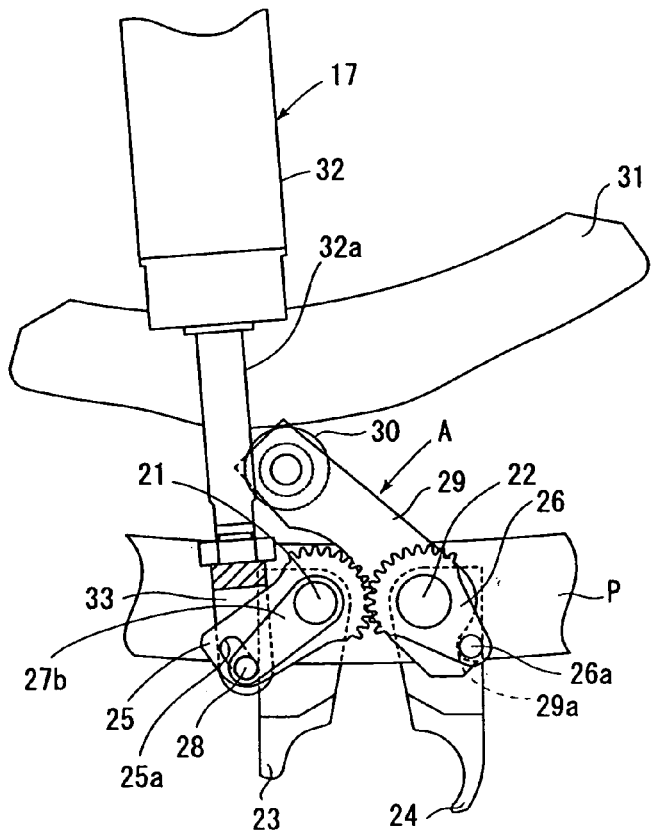
FIG. 6 is a plan view of the gripper A and illustrating a state in which the gripper A is opened in a use state.
Figure 7:
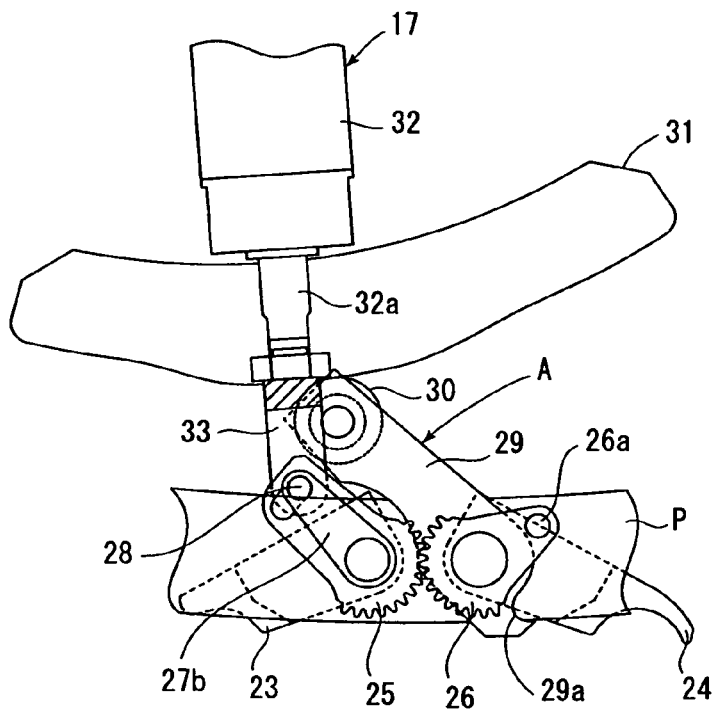
FIG. 7 is a plan view of the gripper A and illustrating a state in which the gripper A is maintained in a released state in a retracted state.

FIGS. 5 and 6 show that the gripper A is brought into the use state by the switching means 17, and FIG. 7 shows that the gripper A is brought into the retracted state by the switching means 17. In FIGS. 5 to 7, the gripper A is moved from left to right in the drawings.

The gripper A includes two of first and second rotating shafts 21 and 22 rotatably supported on upper and lower plates P that are rotated by the drive force of the servo motor, a first grip member 23 fixed to the first rotating shaft 21, a second grip member 24 fixed to the second rotating shaft 22, a first gear member 25 fixed to the first rotating shaft 21, a second gear member 26 fixed to the second rotating shaft 22, and urging means 27 for urging the first and second grip members 23 and 24 in a direction to be closed.

The upper end portions of the first and second rotating shafts 21 and 22 are rotatably supported on the upper plate P, and the lower end portions thereof project downward through the lower plate P. The proximal end portions of the first and second grip members 23 and 24 are respectively fixed to the lower ends of the first and second rotating shafts 21 and 22.

The first and second grip members 23 and 24 grip the upper portion of the neck ring 1a of the plastic bottle 1 from both sides. The distal end of each of the first and second grip members 23 and 24 has a shape suitable for transferring the plastic bottle 1.

The first gear member 25 is fixed to the first rotating shaft 21 to be rotated integrally with the first grip member 23. The second gear member 26 is fixed to the second rotating shaft 22 to be rotated integrally with the second grip member 24.

Gears are formed on the first and second gear members 25 and 26 to mesh with each other. When the first gear member 25 is rotated around the first rotating shaft 21 to allow the first grip member 23 to swing, the second gear member 26 is rotated around the second rotating shaft 22 in conjunction therewith, so that the second grip member 24 swings.

The urging means 27 includes a sleeve 27a fixed to the upper end of the first rotating shaft 21, a transmission member 27b rotatably supported on the first rotating shaft 21 at the upper portion of the first gear member 25, and a spring member 27c loaded between the sleeve 27a and the transmission member 27b. In FIGS. 5 to 7, the sleeve 27a and the spring member 27c are not shown.

A long hole 25a is formed vertically penetrating the first gear member 25. A through hole 27d is formed vertically in the transmission member 27b. A coupling bar 28 is inserted through the long hole 25a and the through hole 27d.

The coupling bar 28 can move along the long hole 25a. Therefore, the first gear member 25 and the transmission member 27b can be rotated around the first rotating shaft 21 within a range of the long hole 25a.

The spring member 27c urges the first gear member 25 in the counter-clockwise direction relative to the transmission member 27b. As a result, the first grip member 23 is maintained in a closed state, and the second grip member 24 is also maintained in a closed state in conjunction therewith as shown in FIG. 5.

The gripper A further includes a pin 26a provided in the second gear member 26, an engaging member 29 rotatably supported on the second rotating shaft 22, and a cam follower 30 provided at one end of the engaging member 29.

Cams 31 are provided in the first supply wheel 11 at a transfer position of the plastic bottle 1 with the discharge wheel Ha of the blow molding unit 3, and a transfer position of the plastic bottle 1 with the receiving wheel 13, respectively.

A substantially hook-shaped engaging portion 29a so as to engage with the pin 26a is formed at the distal end of the engaging member 29. When the engaging member 29 is rotated in the counter-clockwise direction in the drawing around the second rotating shaft 22, the engaging portion 29a engages with the pin 26a.

Meanwhile, the cam follower 30 is provided at the other end of the engaging member 29. When the cam follower 30 engages with the cam 31 to be moved to the outer peripheral side of the plates P, the engaging member 29 is rotated in the counter-clockwise direction in the drawing, to thereby press the pin 26a in the counter-clockwise direction via the engaging portion 29a.

As a result, the second gear member 26 is rotated against the urging force of the urging means 27, so that the second grip member 24 is opened and the first grip member 23 is also opened in conjunction therewith as shown in FIG. 6.

The switching means 17 includes an air cylinder 32 swingably held on an unillustrated rotating table for holding the plates P, and a substantially square U-shaped coupling member 33 (see FIG. 3) provided at the distal end of a rod 32a of the air cylinder 32 to hold the coupling bar 28.

The air cylinder 32 is connected to an unillustrated air supply source. The rod 32a is controlled by the control means to extend as shown in FIGS. 5 and 6 when the gripper A is in the use state and to contract as shown in FIG. 7 when the gripper A is in the retracted state.

The coupling bar 28 is inserted into the long hole 25a of the first gear member 25 as described above. When the coupling bar 28 is moved from the use state to the retracted state by the air cylinder 32, the first gear member 25 is rotated in conjunction therewith, and the first and second grip members 23 and 24 are brought into a released state.

As shown in FIGS. 5 and 6, when in the use state, the rod 32a of the air cylinder 32 extends to hold the coupling bar 28 at a predetermined position, to thereby allow the first and second grip members 23 and 24 to be opened and closed against the urging force of the urging means 27 with the cam follower 30 engaging with the cam 31.

As shown in FIGS. 6 and 7, by comparing the opening degree in the use state of the first and second grip members 23 and 24 and that in the retracted state, the opening degree in the retracted state is larger than that in the use state. In the retracted state, the distal ends of the first and second grip members 23 and 24 are located on the further inner peripheral side of the first supply wheel 11 than that in the use state.

Since the engaging portion 29a and the pin 26a do not engage with each other in the retracted state as shown in FIG. 7, the engaging member 29 is prevented from interfering with another member such as the first rotating shaft 21 even when the first and second grip members 23 and 24 are largely opened.

Next, the gripper B provided in the second supply wheel 12 will be described by using FIG. 8.

The gripper B includes first and second rotating shafts 121 and 122 rotatably supported on a plate P, a first grip member 123 fixed to the first rotating shaft 121, a second grip member 124 fixed to the second rotating shaft 122, a first gear member 125 fixed to the first rotating shaft 121, a second gear member 126 fixed to the second rotating shaft 122, and unillustrated urging means for urging the first and second grip members 123 and 124 in a direction to be closed.

The first and second grip members 123 and 124 grip the upper portion of the neck ring 1a of the plastic bottle 1 from both sides in a similar manner to the first and second grip members 23 and 24 of the aforementioned gripper A. The distal end of each of the first and second grip members 123 and 124 has a shape suitable for transferring the plastic bottle 1.

An arm portion 124a is provided extending toward the inner peripheral side of the plate P in the second grip member 124. A cam follower 130 is provided at the distal end of the arm portion 124a.

Cams 131 are provided in the second supply wheel 12 at a transfer position of the plastic bottle 1 with the infeed screw 4b of the bulk depalletizer 4, and a transfer position of the plastic bottle 1 with the receiving wheel 13, respectively.

When the cam follower 130 abuts against the outer peripheral surface of the cam 131, the cam follower 130 is moved to the outer peripheral side of the plate P along the outer peripheral surface of the cam 131. The second grip member 124 and the first grip member 123 are thereby opened in conjunction with each other via the first and second gear members 125 and 126.

The outer peripheral surface of the cam 131 has a shape most suitable for receiving the plastic bottle 1 from the infeed screw 4b and transferring the plastic bottle 1 to the gripper C of the receiving wheel 13 at the transfer positions.

Figure 3:
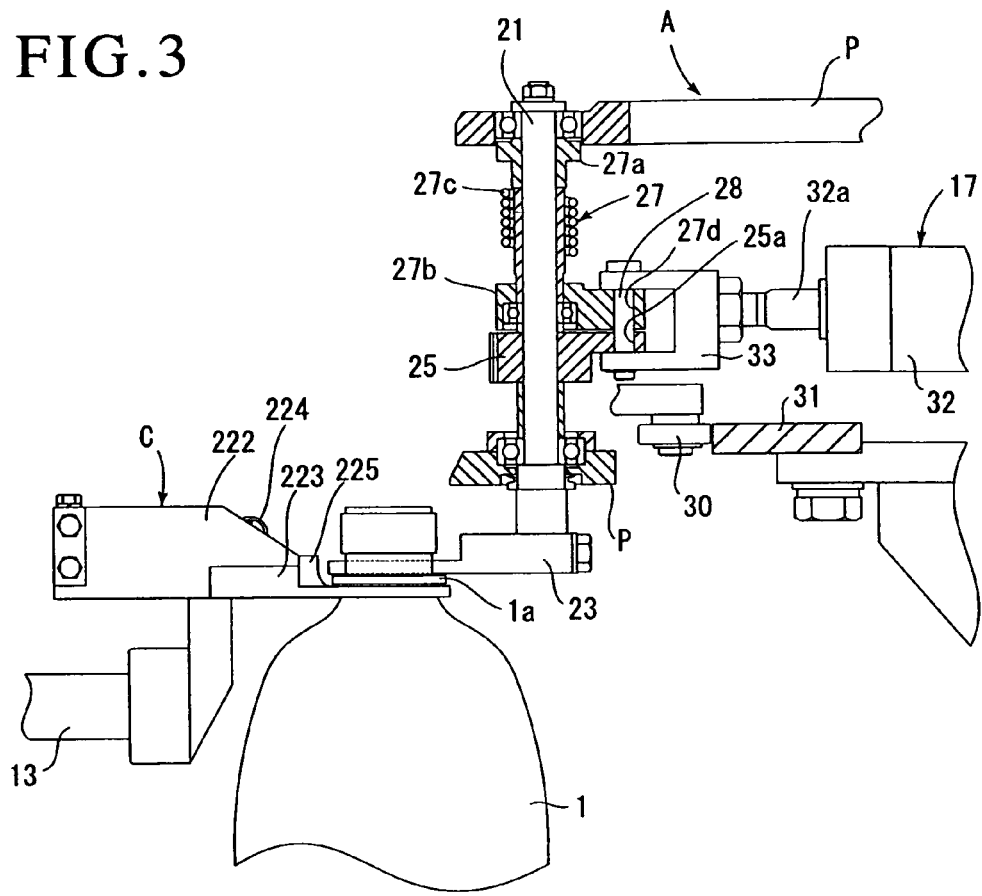
FIG. 3 is a sectional view of a gripper A.
Figure 4:
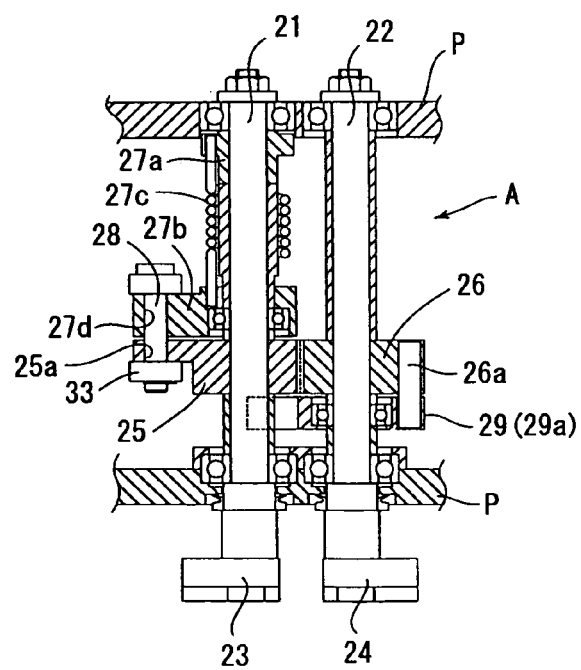
FIG. 4 is an elevation view of the gripper A.
Figure 9:
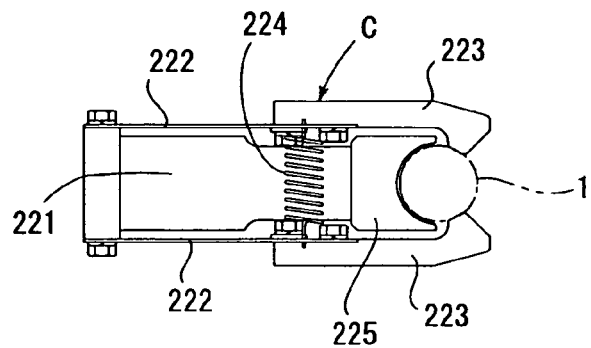
FIG. 9 is a plan view of a gripper C.

Next, the gripper C of the receiving wheel 13 will be described by using FIGS. 3 and 9.

The gripper C includes a stay 221 fixed to the receiving wheel 13, two leaf springs 222 provided at both ends of the stay 221, grip members 223 provided at the distal ends of the respective leaf springs 222, a spring 224 for urging the grip members 223 in a direction to approach each other, and a support member 225 provided between the grip members 223.

The grip members 223 grip the neck ring 1a of the plastic bottle 1 at a position lower than the position gripped by the grippers A and B, and its distal end has a hook-shaped portion to prevent the plastic bottle 1 from falling off.

With the aforementioned configuration, the gripper A of the first supply wheel 11 transfers the plastic bottle 1 to the gripper C of the receiving wheel 13 as described below.

When the first supply wheel 11 and the receiving wheel 13 are rotated and the gripper A holding the plastic bottle 1 and the gripper C approach each other, the plastic bottle 1 held by the gripper A is located between the two grip members 223 of the gripper C.

When the gripper A and the gripper C further approach each other, the plastic bottle 1 forcibly pushes open the grip members 223 against the urging force of the spring 224, and passes through the hook-shaped portions of the grip members 223.

When the gripper A and the gripper C come closest to each other, the grip members 223 are closed by the urging force of the spring 224 to grip the plastic bottle 1 within the gripper C. At this moment, the plastic bottle 1 is gripped by the grippers A and C at the same time.

When the grippers A and C are moved away from each other, the cam follower 30 of the gripper A is moved to the inner peripheral side by the cam 31, to thereby bring the first and second grip members 23 and 24 into the released state. The plastic bottle 1 is thereby released, and the transfer of the plastic bottle 1 to the gripper C is completed.

Since it is necessary for the grippers A and C to grip the plastic bottle 1 at the same time to transfer the plastic bottle 1, the track of the gripper A in the first supply wheel 11 and the track of the gripper C in the receiving wheel 13 overlap with each other at the transfer position as viewed from above.

However, since the first and second grip members 23 and 24 of the gripper A grip the upper position of the neck ring 1a of the plastic bottle 1, and the grip members 223 of the gripper C grip the lower position of the neck ring 1a, the gripper A of the first supply wheel 11 and the gripper C of the receiving wheel 13 do not interfere with each other at the transfer position.

Also, the operation at the time of transferring the plastic bottle 1 from the gripper B of the second supply wheel 12 to the gripper C of the receiving wheel 13 is substantially the same as that described above. The track of the gripper B in the second supply wheel 12 and the track of the gripper C in the receiving wheel 13 overlap with each other at the transfer position as viewed from above.

However, since the first and second grip members 123 and 124 of the gripper B grip the upper position of the neck ring 1a of the plastic bottle 1, and the grip members 223 of the gripper C grip the lower position of the neck ring 1a, the gripper B of the second supply wheel 12 and the gripper C of the receiving wheel 13 do not interfere with each other at the transfer position.

Alternatively, the grippers A and B may grip the lower position of the neck ring 1a of the plastic bottle 1, and the gripper C of the receiving wheel 13 may grip the upper position of the neck ring 1a.

In the following, the operation of the beverage production line 2 having the aforementioned configuration will be described.

First, the operation at the time of filling a beverage into the plastic bottle 1 molded by the blow molding unit 3 by using the first carrier path will be described.

At this point, the operation of the bulk depalletizer 4 is stopped, so that the plastic bottle 1 is not supplied from the bulk depalletizer 4. The gripper A of the first supply wheel 11 is in the use state by the switching means 17.

First, the plastic bottle 1 is molded by the blow molding unit 3, and the molded plastic bottle 1 is transferred from the discharge wheel Ha to the first supply wheel 11 of the appearance inspection unit 5.

The gripper A holding the plastic bottle 1 is then moved to the transfer position with the receiving wheel 13, and the plastic bottle 1 held by the gripper A is transferred to the gripper C of the receiving wheel 13.

The appearance inspection is performed on the plastic bottle 1 molded by the blow molding unit 3 by the first to third inspecting means 14 to 16 while the plastic bottle 1 is being carried by the rotating wheels H of the appearance inspection unit 5. Furthermore, the plastic bottle 1 is rinsed, filled with a beverage, a cap is installed thereon or the like in the filling unit 6.

Since the appearance inspection unit 5 is driven by the single servo motor while the plastic bottle 1 is being carried along the first carrier path, the second supply wheel 12 also continues to be rotated.

However, the gripper B of the second supply wheel 12 does not grip the plastic bottle 1, and the gripper B and the gripper C are displaced from each other at the transfer position, so that the gripper B and the gripper C do not interfere with each other.

Subsequently, the operation at the time of filling a beverage into the plastic bottle 1 from the bulk depalletizer 4 by using the second carrier path will be described.

At this point, the operation of the blow molding unit 3 is stopped, so that the plastic bottle 1 is not supplied from the blow molding unit 3.

First, the bulk depalletizer 4 supplies the plastic bottle 1 one by one from the pallet to the neck carrier conveyor 4a. The infeed screw 4b feeds the plastic bottle 1 one by one to the transfer position. The second supply wheel 12 of the appearance inspection unit 5 receives the container fed to the transfer position by gripping the container using the gripper B.

Thereafter, the gripper B holding the plastic bottle 1 is moved to the transfer position with the receiving wheel 13, and the plastic bottle 1 held by the gripper B is transferred to the gripper C of the receiving wheel 13 at the transfer position.

The appearance inspection is performed on the plastic bottle 1 supplied from the bulk depalletizer 4 by the first to third inspecting means 14 to 16 while the plastic bottle 1 is being carried by the rotating wheels H of the appearance inspection unit 5. Furthermore, the plastic bottle 1 is rinsed, filled with a beverage, a cap is installed thereon or the like in the filling unit 6.

When the plastic bottle 1 is carried through the second carrier path, the gripper C of the receiving wheel 13 holding the plastic bottle 1 passes through the transfer position with the first supply wheel 11 since the second supply wheel 12 is provided on the upstream side in the rotating direction of the receiving wheel 13 from the first supply wheel 11.

Furthermore, since the appearance inspection unit 5 is driven by the single servo motor and the first supply wheel 11 continues to be rotated, the grippers A and C approach each other at the transfer position between the first supply wheel 11 and the receiving wheel 13.

Accordingly, in the present embodiment, the control means brings all the grippers A of the first supply wheel 11 into the retracted state by the switching means 17 such that the grippers A of the first supply wheel 11 do not interfere with the plastic bottle 1 held by the gripper C of the receiving wheel 13.

As a result, the gripper A passing through the transfer position is brought into the released state as shown in FIG. 7, so that the distal ends of the first and second grip members 23 and 24 are released to positions not interfering with the plastic bottle 1 held by the gripper C of the receiving wheel 13.

Therefore, the plastic bottle 1 held by the gripper C can pass through the transfer position with the first supply wheel 11 without interfering with the gripper A of the first supply wheel 11.

When the plastic bottle 1 is carried through the second carrier path, the control means may recognize the position of each of the grippers A of the first supply wheel 11 via the encoder, and bring only the gripper A pasting through the transfer position with the receiving wheel 13 from the use state into the retracted state by the switching means 17, to thereby prevent the gripper A from interfering with the plastic bottle 1 held by the gripper C of the receiving wheel 13 at the transfer position.

With the beverage production line 2 having the aforementioned configuration, the gripper of the first supply wheel 11 is switched between the use state and the retracted state by the switching means 17, so that the plastic bottle 1 can be carried by using the two separate carrier paths.

Therefore, for example, when a new product development test is performed, a plastic bottle 1 having a new shape can be formed in advance and supplied from the bulk depalletizer 4 to the second carrier path.

It is only necessary to stop the blow molding unit 3 normally used for filling a beverage and bring the gripper A of the first supply wheel 11 of the appearance inspection unit 5 into the retracted state. Thus, the carrier paths can be easily switched, so that the new product development test can be easily performed.

Alternatively, by installing another blow molding unit instead of the bulk depalletizer, for example, the mold of one of the blow molding units can be changed while the other blow molding unit is used. Accordingly, even when a variety of beverages are produced, the mold can be effectively changed.

Moreover, since the first and second supply wheels 11 and 12 are located adjacent to the receiving wheel 13, it is not necessary to provide a junction conveyor or the like for switching the carrier paths between the supply wheel and the receiving wheel. Thus, the beverage production line 2 can be installed in a space saving manner.

Figure 10:
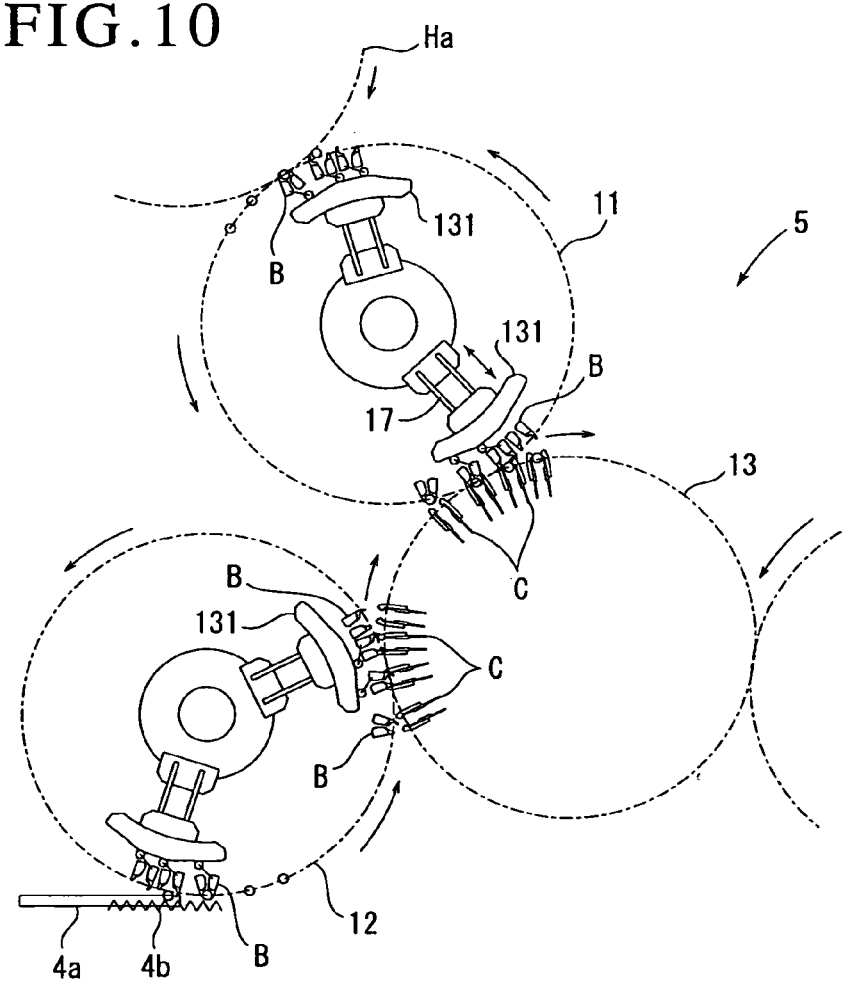
FIG. 10 is a plan view illustrating a portion of an appearance inspection unit according to a second embodiment.

Next, a second embodiment according to the present invention will be described by using FIGS. 10 and 11.

While the grippers A are provided in the first supply wheel 11 and the switching means 17 is provided in each of the grippers A in the first embodiment, the same grippers B as those of the second supply wheel 12 are provided in the first supply wheel 11 at equal intervals in the circumferential direction in the second embodiment.

The switching means 17 in the present embodiment employs driving means such as an air cylinder for reciprocating the cam 131 provided at the transfer position with the receiving wheel 13 between the inner peripheral side and the outer peripheral side of the first supply wheel 11.

Figure 8:
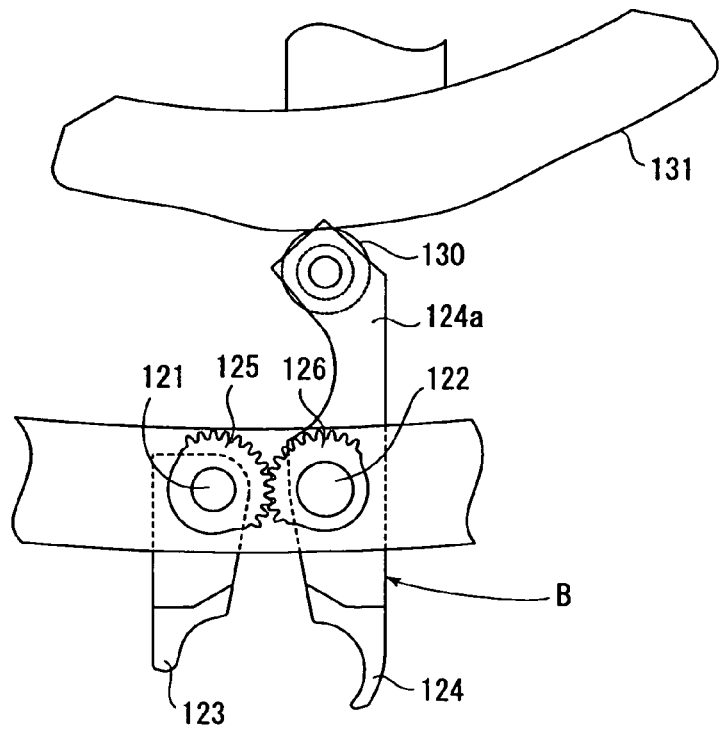
FIG. 8 is a plan view of a gripper B.

The switching means 17 locates the cam 131 on the inner peripheral side as shown in FIG. 8 when the gripper B of the first supply wheel 11 is in the use state, so that the gripper B is opened and closed at the transfer position. The plastic bottle 1 can be thereby transferred to the gripper C of the receiving wheel 13.

Figure 11:
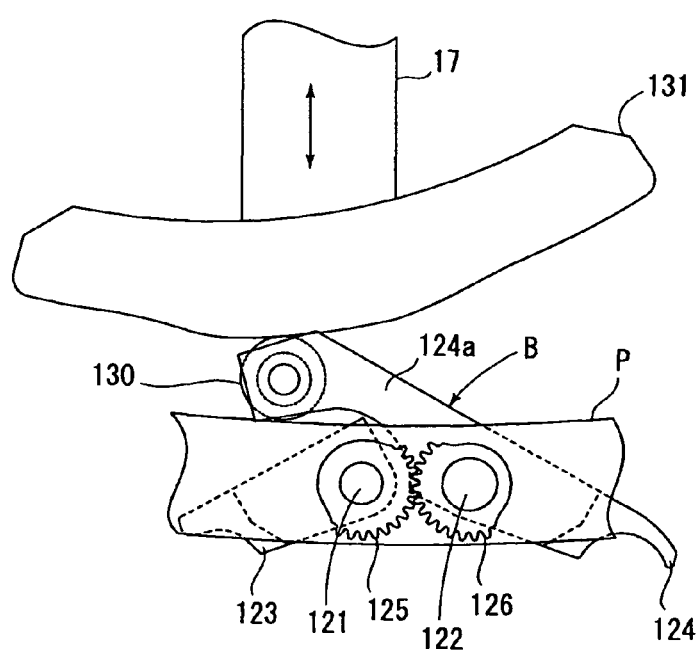
FIG. 11 is a view illustrating a state in which the gripper B is maintained in a retracted state according to the second embodiment.

Meanwhile, the switching means 17 locates the cam 131 on the outer peripheral side as shown in FIG. 11 when the gripper B of the first supply wheel 11 is in the retracted state, so that the cam follower 130 of the gripper B is moved to the further outer peripheral side than that in FIG. 8.

As a result, the distal ends of the first and second grip members 123 and 124 of the gripper B are located on the further inner peripheral side of the first supply wheel 11 than that in the use state, so that the first and second grip members 123 and 124 are brought into the released state at the same opening level as that when the gripper A is in the retracted state in the aforementioned first embodiment.

As described above, in the beverage production line 2 according to the present embodiment, the gripper B of the first supply wheel 11 can be prevented from interfering with the plastic bottle 1 held by the gripper C of the receiving wheel 13 at the time of filling a beverage into the plastic bottle 1 from the bulk depalletizer 4 by using the second carrier path in a similar manner to the aforementioned first embodiment.

Figure 12:
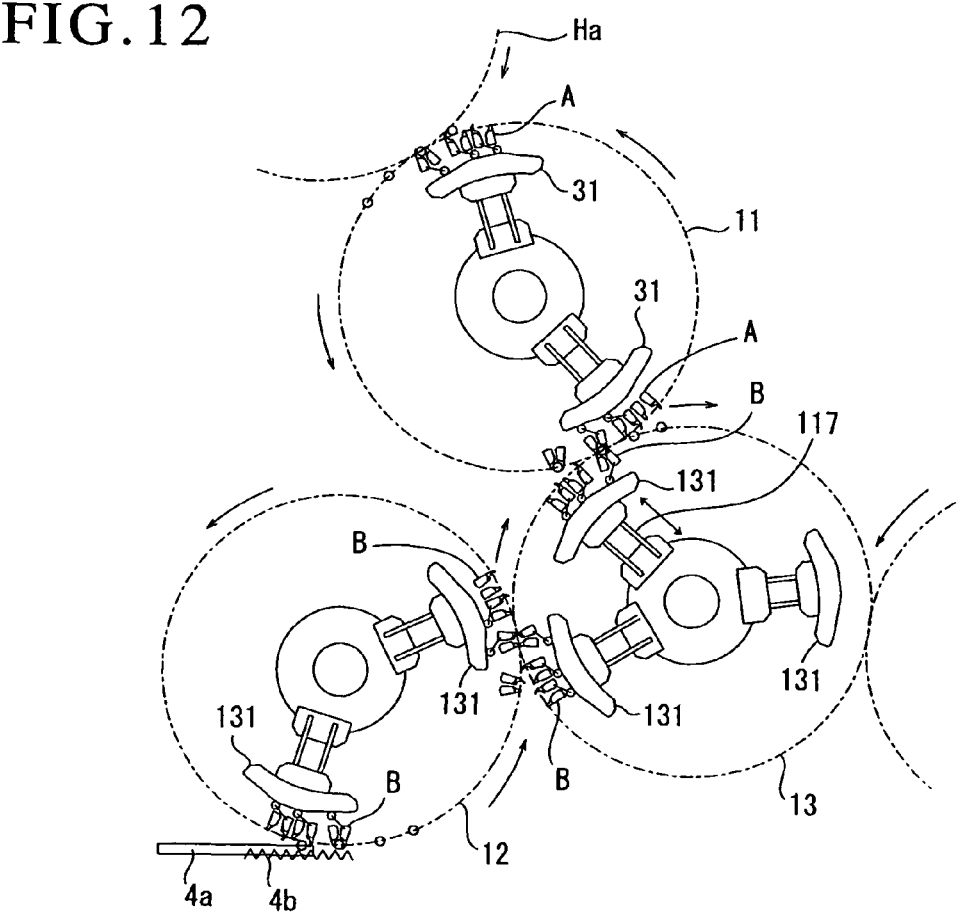
FIG. 12 is a plan view illustrating a portion of an appearance inspection unit according to a third embodiment.

Next, a third embodiment will be described by using FIG. 12.

While the receiving wheel 13 has the grippers C with no opening and closing mechanism in the first embodiment, the same grippers B as those of the second supply wheel 12 are provided in the receiving wheel 13 at equal intervals in the circumferential direction in the third embodiment.

The cams 131 are provided in the receiving wheel 13 at three positions, the transfer position with the first supply wheel 11, the transfer position with the second supply wheel 12, and the transfer position with the first rotating wheel H. The gripper B is opened and closed at an optimum timing for transferring the plastic bottle 1 by the cams 131.

The cam 131 provided at the transfer position with the first supply wheel 11 is reciprocated between the inner peripheral side and the outer peripheral side of the receiving wheel 13 by second switching means 117 such as an air cylinder.

The second switching means 117 brings the gripper B as shown in FIG. 8 into an opening and closing state when the cam 131 is located on the outer peripheral side of the receiving wheel 13. Accordingly, the gripper B of the receiving wheel 13 is opened and closed at the transfer position with the first supply wheel 11, and can thereby receive the plastic bottle 1.

Meanwhile, the second switching means 117 locates the cam 131 on the further inner peripheral side of the receiving wheel 13 than the state in FIG. 8, to thereby prevent the cam follower 130 of the gripper B from contacting the cam 131.

As a result, the first and second grip members 123 and 124 of the gripper B are maintained in a closed state by the urging member. Accordingly, the gripper B is maintained in a closed state at the transfer position with the first supply wheel 11.

With the aforementioned configuration, when the plastic bottle 1 from the blow molding unit 3 is filled with a beverage by using the first carrier path, the gripper A of the first supply wheel 11 is brought into the use state by the switching means 17. The second switching means 117 of the receiving wheel 13 brings the gripper B into the opening and closing state by locating the cam 131 on the outer peripheral side.

As a result, the plastic bottle 1 held by the gripper A of the first supply wheel 11 is transferred by the opening and closing operation of the gripper B of the receiving wheel 13 at the transfer position with the receiving wheel 13.

Meanwhile, when the plastic bottle 1 from the bulk depalletizer 4 is filled with a beverage by using the second carrier path, the gripper A of the first supply wheel 11 is brought into the retracted state by the switching means 17. The second switching means 117 brings the gripper B of the receiving wheel 13 into the closed state by locating the cam 131 on the inner peripheral side.

Accordingly, the plastic bottle 1 held by the gripper B of the second supply wheel 12 is transferred by the opening and closing operation of the gripper B of the receiving wheel 13 at the transfer position with the receiving wheel 13, first.

When the gripper B of the receiving wheel 13 is moved to the transfer position with the first supply wheel 11, the gripper B of the receiving wheel 13 is maintained in the closed state by the second switching means 117, so that the plastic bottle 1 does not fall off.

Meanwhile, since the gripper A of the first supply wheel 11 is in the retracted state by the switching means 17, the gripper A does not interfere with the plastic bottle 1 held by the gripper B of the receiving wheel 13.

As described above, in the beverage production line 2 according to the present embodiment, the gripper A of the first supply wheel 11 can be prevented from interfering with the plastic bottle 1 held by the gripper B of the receiving wheel 13 at the time of filling a beverage into the plastic bottle 1 from the bulk depalletizer 4 by using the second carrier path in a similar manner to the aforementioned first and second embodiments.

In the third embodiment, the gripper B may be employed instead of the gripper A in the first supply wheel 11 in a similar manner to the second embodiment, and the driving means for moving the cam 131 of the first supply wheel 11 may be employed as the switching means 17.

Figure 13:
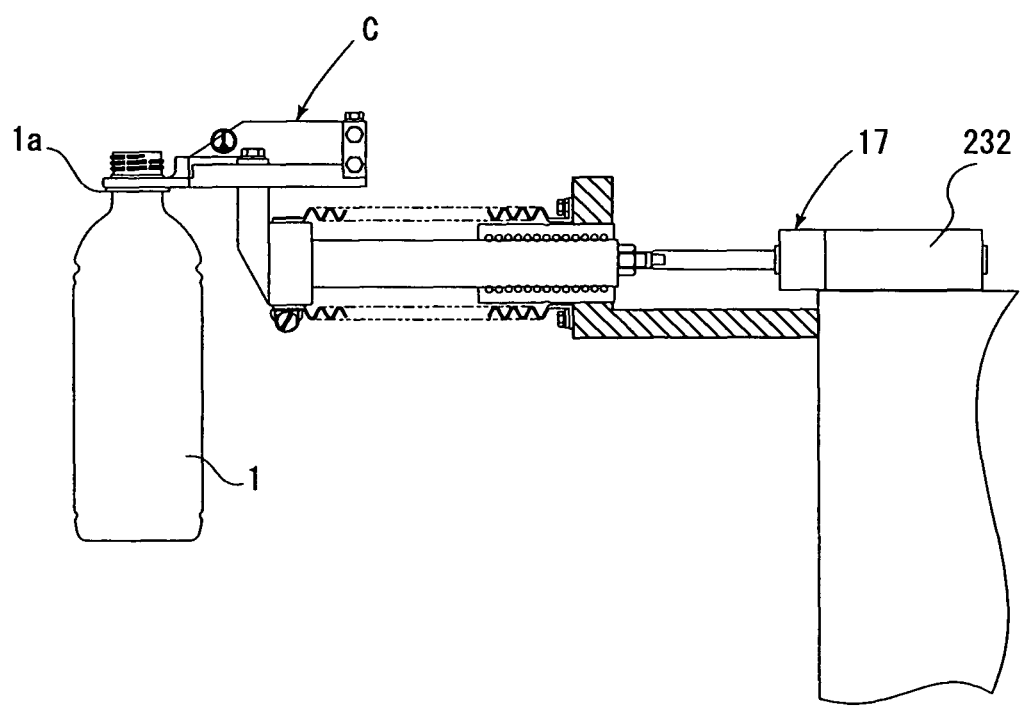
FIG. 13 is a view illustrating a state in which the gripper C is maintained in a use state according to a fourth embodiment.

Next, a fourth embodiment will be described by using FIG. 13.

While the grippers A and B having the opening and closing mechanisms are provided in the first and second supply wheels 11 and 12 and the gripper C having no opening and closing mechanism is provided in the receiving wheel 13 in the first embodiment, the grippers C having no opening and closing mechanisms are provided in the first and second supply wheels 11 and 12 and the gripper B having the opening and closing mechanism is provided in the receiving wheel 13 in the fourth embodiment.

Each of the grippers C of the first supply wheel 11 can be switched between the use state located on the outer peripheral side and the retracted state located on the inner peripheral side by an air cylinder 232 as the switching means 17.

The cams 131 are provided in the receiving wheel 13 at the transfer position with the first supply wheel 11 and at the transfer position with the second supply wheel 12 such that the gripper B receives the plastic bottle 1 from the respective grippers C while performing the opening and closing operation.

The cam 131 provided in the receiving wheel 13 at the transfer position with the first supply wheel 11 can be moved to the inner peripheral side and the outer peripheral side by the second switching means 117 in a similar manner to the aforementioned third embodiment.

With the aforementioned configuration, when the plastic bottle 1 from the blow molding unit 3 is filled with a beverage by using the first carrier path, the gripper C of the first supply wheel 11 is brought into the use state by the switching means 17, and is thereby located on the outer peripheral side of the first supply wheel 11.

As a result, the plastic bottle 1 held by the gripper C of the first supply wheel 11 is transferred by the opening and closing operation of the gripper B of the receiving wheel 13 at the transfer position with the receiving wheel 13.

Meanwhile, when the plastic bottle 1 from the bulk depalletizer 4 is filled with a beverage by using the second carrier path, the control means brings all the grippers C provided in the first supply wheel 11 into the retracted state by the switching means 17, so that all the grippers C are located on the inner peripheral side.

Also, in the receiving wheel 13, the second switching means 117 moves the cam 131 to the inner peripheral side and thereby maintains the gripper B in the closed state at the transfer position with the first supply wheel 11.

As a result, the plastic bottle 1 held by the gripper B of the receiving wheel 13 at the transfer position with the second supply wheel 12 does not fall off from the gripper B and does not interfere with the gripper C of the first supply wheel 11 at the transfer position with the first supply wheel 11.

As described above, in the beverage production line 2 according to the present embodiment, the gripper C of the first supply wheel 11 can be prevented from interfering with the plastic bottle 1 held by the receiving wheel 13 at the time of filling a beverage into the plastic bottle 1 from the bulk depalletizer 4 by using the second carrier path in a similar manner to the aforementioned first to third embodiments.

When the plastic bottle 1 from the bulk depalletizer 4 is filled with a beverage by using the second carrier path, the control means may recognize the position of each of the grippers C via the encoder provided in the first supply wheel 11, and bring the gripper C into the retracted state by the switching means 17 when the gripper C passes through the transfer position, to thereby prevent the gripper C from interfering with the plastic bottle 1 held by the gripper B of the receiving wheel 13.

What is claimed is:

1. An article carrier apparatus in which a plurality of rotating wheels, each having a plurality of grippers provided at equal intervals in a circumferential direction to grip an article, are arranged and an article is transferred from a gripper of a supply wheel on an upstream side to a gripper of a receiving wheel on a downstream side at a transfer position where the rotating wheels are located adjacent to each other, and the received article is transferred from the receiving wheel to a rotating wheel adjacent to the receiving wheel on a downstream side, comprising:

a first supply wheel adjacent to the receiving wheel and a second supply wheel provided on an upstream side in a rotating direction of the receiving wheel from the first supply wheel, as the supply wheel, and switching means for switching a gripper of the first supply wheel between a use state so as to transfer the article to the gripper of the receiving wheel and a retracted state so as not to interfere with the article held by the gripper of the receiving wheel, wherein when a first carrier path for transferring the article from the first supply wheel to the receiving wheel and the received article is transferred from the receiving wheel to the rotating wheel adjacent to the receiving wheel on a downstream side is used, the switching means brings the gripper of the first supply wheel into the use state and when a second carrier path for transferring the article from the second supply wheel to the receiving wheel and the received article is transferred from the receiving wheel to the rotating wheel adjacent to the receiving wheel on a downstream side is used, the switching means brings the gripper of the first supply wheel into the retracted state, to thereby prevent the gripper of the first supply wheel from interfering with the article held by the gripper of the receiving wheel from the second supply wheel.

2. The article carrier apparatus according to claim 1, further comprising a motor for rotating the first supply wheel, the second supply wheel, the receiving wheel and the rotating wheel adjacent to the receiving wheel on a downstream side in synchronization, wherein the second supply wheel continues to be rotated when the first carrier path is used, and the first supply wheel continues to be rotated when the second carrier path is used.

3. The article carrier apparatus according to claim 1, wherein the gripper of the receiving wheel comprises a pair of grip members provided in an openable and closable manner to grip the article, and second switching means for switching the gripper of the receiving wheel between an opening and closing state in which the grip members are opened and closed to receive the article and a closed state in which the grip members are maintained in a closed state at a transfer position of the article with the first supply wheel is provided, the second switching means bringing the gripper into the opening and closing state when the first carrier path is used, and the second switching means bringing the gripper into the closed state to maintain the gripper in a state of gripping the article received from the second supply wheel when the second carrier path is used.

4. The article carrier apparatus according to claim 1, wherein one of the first supply wheel and the second supply wheel transfers a plastic bottle molded by a blow molding unit to the receiving wheel, and the other one of the first supply wheel and the second supply wheel transfers a plastic bottle from a bulk depalletizer to the receiving wheel.

* * * * *